US012705881B2

(12) United States Patent
Galic

(10) Patent No.: US 12,705,881 B2
(45) Date of Patent: Aug. 11, 2026

(54) USE OF ONE OR MORE OBSERVATION SATELLITES FOR TARGET IDENTIFICATION

(71) Applicant: UNSEENLABS, Rennes (FR)

(72) Inventor: Jonathan Galic, Rennes (FR)

(73) Assignee: UNSEENLABS, Cesson-Sévigné (FR)

( * ) Notice: Subject to any disclaimer, the term of this patent is extended or adjusted under 35 U.S.C. 154(b) by 0 days.

(21) Appl. No.: 18/843,210

(22) PCT Filed: Mar. 2, 2023

(86) PCT No.: PCT/EP2023/055370
§ 371 (c)(1),
(2) Date: Aug. 30, 2024

(87) PCT Pub. No.: WO2023/166146
PCT Pub. Date: Sep. 7, 2023

(65) Prior Publication Data
US 2025/0095358 A1 Mar. 20, 2025

(30) Foreign Application Priority Data
Mar. 4, 2022 (EP) .................................... 22305255

(51) Int. Cl.

| | |
|---|---|
| ***G06V 20/00*** | (2022.01) |
| ***G06V 20/13*** | (2022.01) |
| ***G06V 20/52*** | (2022.01) |
| *H04B 7/185* | (2006.01) |

(52) U.S. Cl.
CPC .............. *G06V 20/13* (2022.01); *G06V 20/52* (2022.01); *G06V 2201/07* (2022.01); *H04B 7/18513* (2013.01); *H04B 7/18521* (2013.01)

(58) Field of Classification Search
CPC .... G06V 20/13; G06V 20/52; G06V 2201/07; H04B 7/18513; H04B 7/18521; H04W 84/06
See application file for complete search history.

(56) References Cited

U.S. PATENT DOCUMENTS

| | | | | |
|---|---|---|---|---|
| 4,241,456 | A * | 12/1980 | Nakagaki | G08C 23/04 398/208 |
| 11,228,362 | B2 * | 1/2022 | Schloemer | H04B 7/18513 |
| 11,429,168 | B1 * | 8/2022 | Rettger | G06F 1/26 |
| 11,733,693 | B2 * | 8/2023 | Zhu | G05D 1/0022 701/2 |

(Continued)

FOREIGN PATENT DOCUMENTS

| | | | |
|---|---|---|---|
| EP | 3 602 118 | B1 | 2/2022 |
| EP | 3 985 621 | A1 | 4/2022 |
| WO | 2020/250708 | A1 | 12/2020 |

*Primary Examiner* — Frank F Huang
(74) *Attorney, Agent, or Firm* — BakerHostetler

(57) ABSTRACT

A computing system including: a communication link with a plurality of observation satellites; one or more processing logic configured to: receive as input a Zone Of Interest selected in a ZOI database, the input being received at the occurrence of an event; send to one or more observation satellites belonging to the plurality of observation satellites instructions to perform one or more observations of the Zone Of Interest; detect one or more objects in the output of the one or more observations; identify one or more targets from the one or more objects.

16 Claims, 9 Drawing Sheets

(56) References Cited

U.S. PATENT DOCUMENTS 12,241,970 B1* 3/2025 Pennings ............... B64G 1/242
12,322,187 B1* 6/2025 Boydston .............. G01S 13/931
12,379,466 B2* 8/2025 Laurila ............... G01S 13/9041
2002/0009978 A1* 1/2002 Dukach .................... G08G 1/01
455/457
2002/0034067 A1* 3/2002 Massaro ............... A47F 5/0068
361/728
2003/0136832 A1* 7/2003 Massaro ................. G09F 3/208
235/383
2004/0195774 A1* 10/2004 Segan .................. G04B 47/048
273/359
2006/0082642 A1* 4/2006 Wang ..................... H04N 7/142
348/14.05
2007/0049159 A1* 3/2007 Kulis, II ................ A63H 17/28
446/438
2007/0078566 A1* 4/2007 Wang ..................... A61B 34/70
700/259
2007/0103890 A1* 5/2007 Morehead ............ A01K 27/006
362/103
2007/0228755 A1* 10/2007 Alvarado ............... B62D 41/00
340/425.5
2007/0291128 A1* 12/2007 Wang ..................... H04N 7/185
901/1
2009/0125147 A1* 5/2009 Wang .................... G06T 7/0012
715/764
2010/0010672 A1* 1/2010 Wang .................. G05D 1/0242
901/1
2012/0154582 A1* 6/2012 Johnson ................. G06Q 10/00
340/521
2017/0041520 A1* 2/2017 Carlotto ................... H04N 7/18
2021/0036767 A1* 2/2021 Devaraj ................. H04B 7/195
2025/0278892 A1* 9/2025 Wannerberg ............ G06T 7/579

* cited by examiner

USE OF ONE OR MORE OBSERVATION SATELLITES FOR TARGET IDENTIFICATION

CROSS-REFERENCE TO RELATED APPLICATIONS

This application is a National Stage of International patent application PCT/EP2023/055370, filed on Mar. 2, 2023, which claims priority to foreign European patent application No. EP 22305255.6, filed on Mar. 4, 2022, the disclosures of which are incorporated by reference in their entireties.

FIELD OF THE INVENTION

The present invention relates to the field of satellites. More specifically, it relates to the optimal selection of one or more observation satellites in a fleet of satellites.

BACKGROUND PRIOR ART

A satellite observation consists in observing a scene by a satellite, then transmitting the output of the observation for a future use. For example, an optical satellite observation consists in capturing an image by the satellite then sending the image for future use.

In general, the satellites are controlled by ground stations. Therefore, the instructions to perform an observation are usually sent to the satellite by a ground station, and the output of the observation is usually also sent to a ground station, or more generally to a terminal on ground.

Depending upon the observational capabilities of satellites, many different types of observations can be performed, such as for example image capture, detection of radiation, thermal imaging, etc. . . . .

The observations from the satellites are usually processed by a human operator. This limits the ability of detecting targets in the satellite observations. Furthermore, when it is necessary to track a target, the human operator needs to perform the relevant decisions to execute the tracking. This limits the ability to track a target in real time.

There exists therefore the need for an automatic target identification from the observations from observation satellites, and an automatic tracking of targets by satellite observations.

SUMMARY OF THE INVENTION

To this effect, the invention discloses a computing system comprising: a communication link with a plurality of observation satellites; one or more processing logic configured to: receive as input a Zone Of Interest selected in a ZOI database, said input being received at the occurrence of an event; send to one or more observation satellites belonging to said plurality of observation satellites instructions to perform one or more observations of said Zone Of Interest detect one or more objects in the output of said one or more observations; identify one or more targets from said one or more objects. The processing logic is located on the ground, for example in a ground processing center. This ground processing center may be fixed or may be carried on a terrestrial vehicle (e.g car, train . . . ), a maritime vehicle (e.g boat, submarine . . . ) or an aerial vehicle (e.g plane, helicopter . . . ). In variant, the processing logic is located in space, in one or more observation satellites. In another variant, the processing logic is split between a ground part and a space part.

Advantageously, the one or more processing logic is configured to identify said one or more targets if values of parameters of said one or more objects match values of parameters of descriptors of targets.

Advantageously, the one or more processing logic is configured to identify said one or more targets if values of parameters of said one or more objects do not match values of parameters of any descriptor of a non-target object.

Advantageously, said event is a detection of said one or more targets in said Zone Of Interest.

Advantageously, said one or more target is a vehicle, and said event is a detection of a disappearance of, or a loss of communication with said vehicle.

Advantageously, said vehicle is configured to communicate with a surveillance system, and said event is a detection of a lack of reception of signals from said vehicle.

Advantageously, the Zone Of Interest is centered on one of a last know position of the target, or an estimated position of the target.

Advantageously, one or more dimensions of the Zone Of Interest is dependent upon a position uncertainty of the target.

Advantageously, said Zone Of Interest is a 3D volume, and a height of said 3D volume is dependent upon an altitude uncertainty of the aircraft.

Advantageously, said one or more processing logic is configured to define a plurality of Zones Of Interest around one or more estimated positions of the target.

Advantageously, said one or more processing logic is further configured to locate said one or more targets.

Advantageously, said one or more processing logic is further configured to determine one or more additional Zones Of Interest to observe based upon one or more of an observed position and estimated future positions of said one or more targets.

The invention also discloses an observation system comprising: a plurality of observation satellites; a computing system according to one of the embodiments of the invention.

The invention also discloses a computer-implemented method comprising the steps of: receiving as input a Zone Of Interest selected in a ZOI database, said input being received at the occurrence of an event; sending to one or more observation satellites belonging to said plurality of observation satellites instructions to perform one or more observations of said Zone Of Interest; detecting one or more objects in the output of said one or more observations; identifying one or more targets from said one or more objects.

The invention also discloses a computer program product, stored on a non-volatile computer-readable data-storage medium, comprising computer-executable instructions to cause a computer system to carry out the computer-implemented method according to one of the embodiments of the invention.

The invention also discloses a computing system comprising: a communication link with a plurality of observation satellites; one or more database comprising: an ephemeris database; one or more processing logic configured to: receive as input a Zone Of Interest; perform a selection of one or more satellites among said plurality of observation satellites based at least on a minimization of at least one parameter selected in a group of parameters comprising, for a satellite: an observation time, at which each the satellite is able to perform an observation of said Zone Of Interest; a delivery time at which an output of the observations from the satellite can be transferred to a ground receiver; a difference between said delivery time, and said observation time; send to said selected one or more satellites instructions to perform one or more observations of said Zone Of Interest.

Advantageously, the delivery time is the earliest time at which the satellite is able to transfer the output of its observations to the ground.

Advantageously, the delivery time is the earliest time at which the output of the observation from the satellite can be received by a final receiver.

Advantageously, said communication link comprises an Inter Satellite Link (ISL), and at least one of said observation time and said delivery time is calculated based on a communication using said Inter Satellite Link.

Advantageously, the one or more processing logic is further configured to: detect one or more objects in the output of said one or more observations.

Advantageously, the one or more processing logic is further configured to identify one or more targets from said one or more objects.

Advantageously, the one or more processing logic is configured to identify said one or more targets if values of parameters of said one or more objects match values of parameters of descriptors of targets.

Advantageously, the one or more processing logic is configured to identify said one or more targets if values of parameters of said one or more objects do not match values of parameters of any descriptor of a non-target object.

Advantageously, the one or more database comprises a satellite capabilities database; said satellite capabilities database indicates for each satellite at least one observational capabilities belonging to at least two different types of observational capabilities; the selection depends upon observational capabilities.

Advantageously, one or more descriptors of one or more targets or non-target objects comprise an indication of how the one or more targets or non-target objects can be observed; the selection depends upon a matching between said observational capabilities and said indication of how the one or more targets can be observed.

Advantageously, said indication of how the one or more targets or non-target objects can be observed comprise an indication of frequency bands in which the one or more target emit electromagnetic waves.

Advantageously, said selection comprises filtering the satellites whose observational capabilities match said indication of how the one or more targets or non-target objects can be observed.

Advantageously, said selection is performed by a cost function of one or more parameters.

Advantageously, said one or more parameters comprises observational capabilities of the satellites.

Advantageously, the determination of one or more of the observation time $T_{obs}$ and the delivery time $T_{del}$ takes into account a communication between the selected satellite and at least one other satellite.

The invention also discloses an observation system comprising: a plurality of observation satellites; a computing system according to one of the embodiments of the invention.

The invention also discloses a computer-implemented method comprising the steps of: receiving as input a Zone Of Interest; performing a selection of one or more satellites among said plurality of observation satellites based at least on a minimization of at least one parameter selected in a group of parameters comprising, for a satellite: an observation time, at which each the satellite is able to perform an observation of said Zone Of Interest; a delivery time at which an output of the observations from the satellite can be transferred to a ground receiver; a difference between said delivery time, and said observation time; sending to said selected one or more satellites instructions to perform one or more observations of said Zone Of Interest.

The invention also discloses a computer program product, stored on a non-volatile computer-readable data-storage medium, comprising computer-executable instructions to cause a computer system to carry out the computer-implemented method according to one of the embodiments of the invention.

BRIEF DESCRIPTION OF THE DRAWINGS

The invention will be better understood and its various features and advantages will emerge from the following description of a number of exemplary embodiments provided for illustration purposes only and its appended figures in which.

DETAILED DESCRIPTION OF THE INVENTION

Figure 1A:
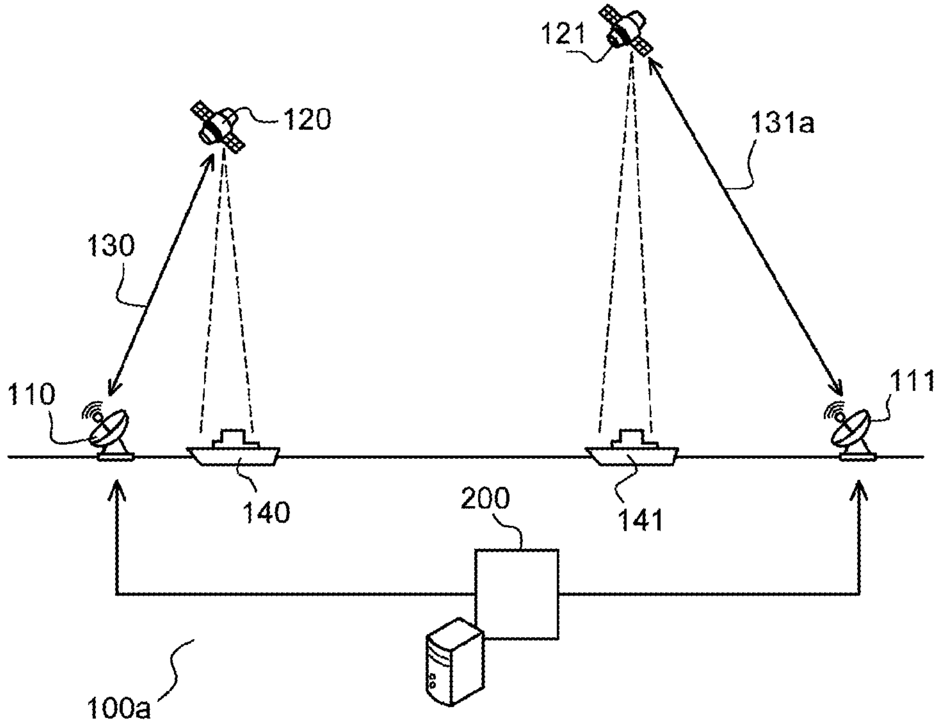
FIG. 1*a* represents a first example of an observation system in a number of embodiments of the invention, comprising a direct communication link between a ground terminal and a satellite.

FIG. 1*a* represents a first example of an observation system in a number of embodiments of the invention, comprising a direct communication links between ground terminals and satellites.

The observation system 100*a* comprises:

a plurality observation satellites 120, 121;

a computing system 200.

In the example of FIG. 1*a*, two observation satellites 120 and 121 are represented. This is however represented by means of non limitative illustrative example only, and, in various embodiments of the invention, the observation system may comprise more than two observation satellites.

In the example of FIG. 1*a*, the two observation satellites 120 and 121 are respectively able to observe two targets 140 and 141, which are in this example boats.

The computing system 200, which will be described in more details with reference to FIG. 2, comprises a communication link with said plurality of observation satellites 120, 121.

The communication link comprises the use of an antenna 110, 111, and a direct communication between the antenna on ground and the satellite. It comprises at least one antenna to communicate with the satellites. In a number of embodiments of the invention, more than one antenna may be used, the different antennas being used for communicating with different satellites and/or with a single satellite.

In the observation system 100*a*, the communication link uses:

- an antenna 110 of a ground station to communicate 130 with the satellite 120;
- an antenna 111 of a ground station to communicate 131*a* with the satellite 121.

The communication can be unidirectional or bidirectional, which means that the computing system 200 can send instructions to and/or receive observations from the plurality of satellites.

Depending upon its position on its orbit, a satellite may be able to communicate with different antennas.

The observation system 100*a* therefore allows communicating with observation satellites to provide them instructions to perform observations and receive the output of the observations.

Figure 1B:
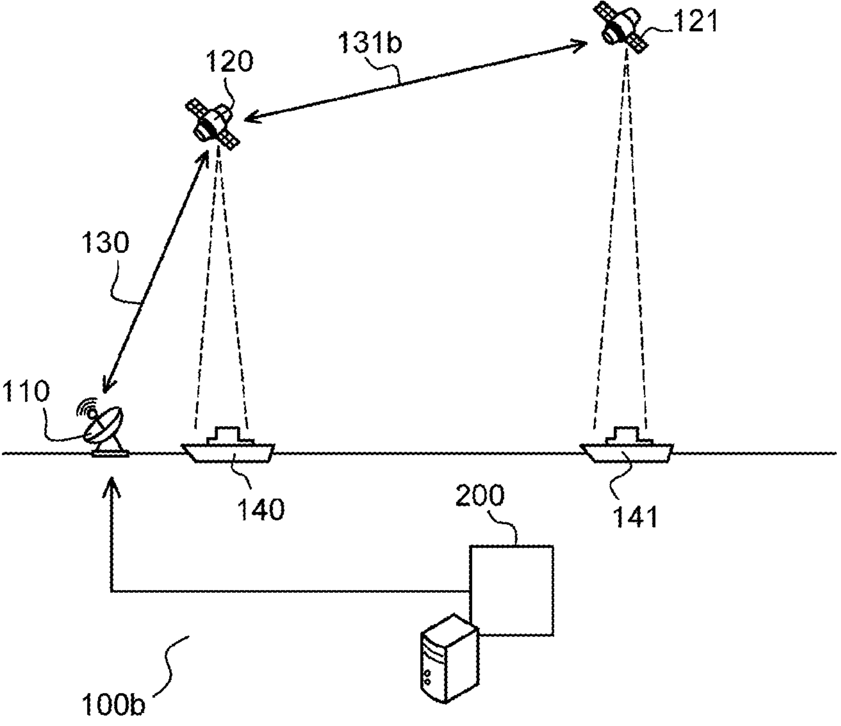
FIG. 1*b* represents a second example of an observation system in a number of embodiments of the invention, comprising a network of communicating observation satellites.

FIG. 1*b* represents a second example of an observation system in a number of embodiments of the invention, comprising a network of communicating observation satellites.

The system 100*b* is very similar to the system 100*a*, except that:

- the ground station 111 is not present;
- the observation satellites are able to communicate. For example, in the system 100*b*, the satellites 120 and 121 are able to communicate via 131*b*. This is called "Inter Satellite Link" (ISL). An ISL may use different communication links, such as Radio Frequency (RF) or optical communications.

Therefore, a communication link can be established between the computing system 200 and the satellite 121 via satellite 120: the computing system 200 communicates with the antenna 110 which communicates 130 with the satellite 120 which itself communicated 131*b* with the satellite 121. This communication could either be directed from the computing system 200 to satellite 121, from the satellite 121 to the computing system 200, or be bi-directional.

This greatly increases the ability to communicate with the satellites, because it is possible to communicate through other satellites, even when a satellite is not able to communicate directly with ground station antennas.

Figure 1C:
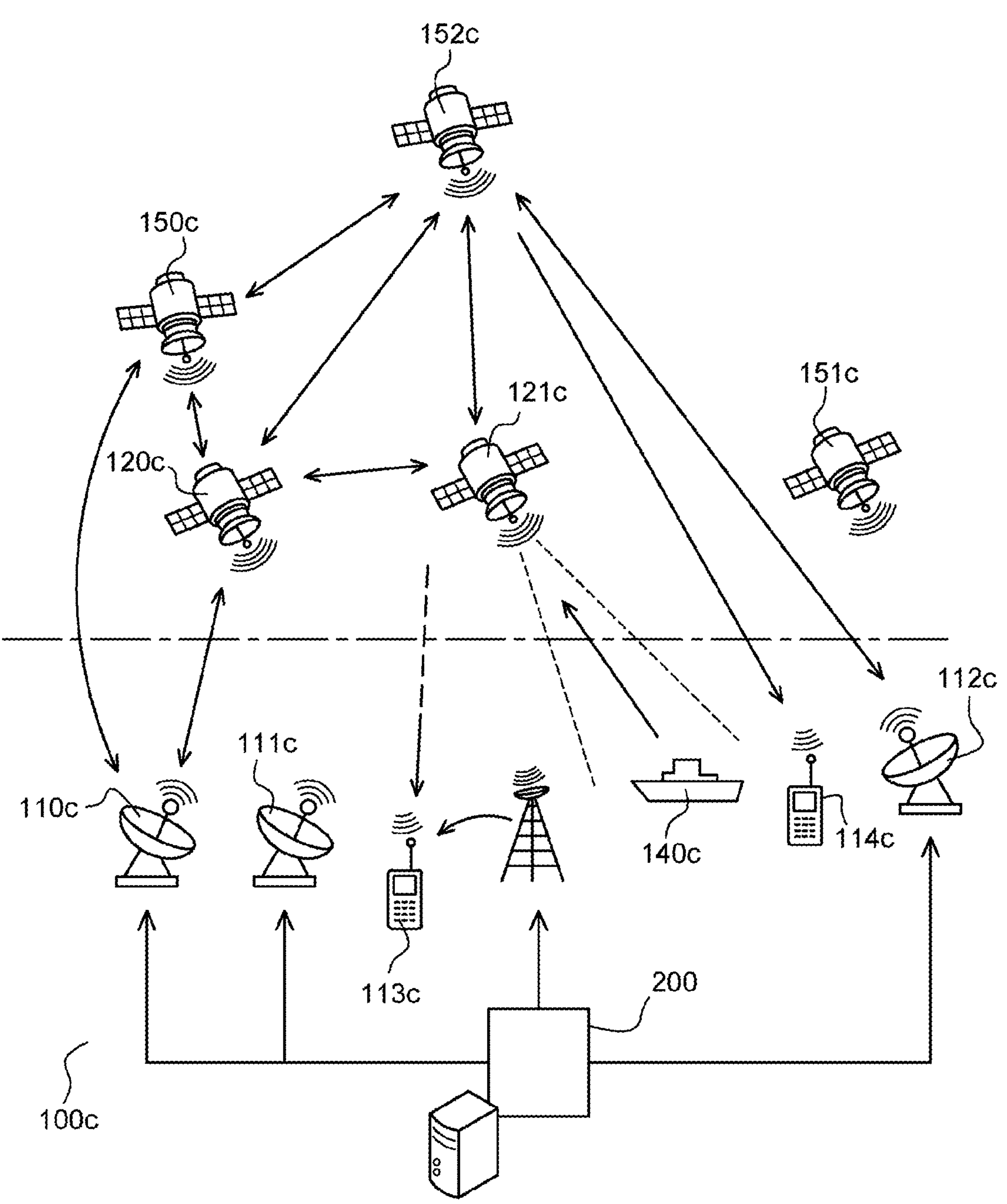
FIG. 1*c* represents a third example of an observation system in a number of embodiments of the invention, comprising a communication network of communication and observation satellites.

FIG. 1*c* represents a third example of an observation system in a number of embodiments of the invention, comprising a communication network of communication and observation satellites.

In the example of FIG. 1*c*, the observation system 100*c* comprises a plurality of ground antennas, observation satellites, and communication satellites.

More specifically, it comprises:

- two observation satellites 120*c*, and 121*c*, the satellite 121*c* being able to observe the target 140*c;*
- three communication satellites 150*c*, 151*c* and 152*c;*
- five ground terminals:
  - three fixed ground stations 110*c*, 111*c* and 112*c;*
  - a 5G or equivalent phone with satellite communication capabilities 113*c;*
  - a mobile SATCOM receiver 114*c*.

The satellites may follow different orbits.

The observation satellites usually follow a Low Earth Orbit (LEO) in order to be as close as possible to the Earth surface for performing their observations. Other orbits are however possible in certain cases.

Telecommunication satellites 150*c*, 151*c*, 152*c* may either follow a LEO, a Medium Earth Orbit (MEO), or a geostationary orbit.

The arrows represent the possible communications between satellites and the ground terminals.

As can be seen in FIG. 1*c*, different types of communications links are possible:

- Communication links between observation satellites such as the satellites 120*c* and 121*c*, using an ISL;
- Communication links between observation and communication satellites;
- Communication links between communication satellites;
- Communication links between ground terminals and observation satellites;
- Communication links between ground terminals and communication satellites.

The communication links between satellites and ground terminals may be either bi-directional (such as the communication link between the ground station 110*c* and the satellite 150*c*), or unidirectional (such as the communication link between from satellite 152*c* to the mobile SATCOM receiver 114*c*, or a communication link from a ground station to a satellite).

The use of communication satellites provides more flexibility to perform communications between the satellites. It also offers the use of satellites with higher communication capabilities, which may for example be able to send information directly to mobile user terminals such as the 5G phone 113*c* and the mobile SATCOM receiver 114*c*. It is worth noting that this is provided by means of non limitative example only, and, in other embodiments of the invention, observation satellites are able to communicate directly with mobile ground terminals.

In a number of embodiments of the invention, the observation and/or communication satellites may be able to communicate to communication antennas such as 5G antennas, so that it is possible to send data to a large number of user terminals by sending data to the communication antenna along with a user identifier such as a phone number or a URL. Conversely, if the antenna is able to send data to the satellites, users of a communication network comprising the antenna may be able to send instructions to the satellites using their personal terminals connected to the network.

Meanwhile, the computing system 200 is, as in the example of systems 100*a* and 100*b*, able to communicate with ground stations 110*c*, 111*c* and 112*c*. It may also be able to communicate with the 5g phone 113*c* and mobile SATCOM terminal 114*c*.

The computing system may communicate with observation satellites through a number of ground terminals, other observations satellites and/or communication satellites.

The observation satellites may also send the output of observations to mobile user terminals, either through fixed ground stations or communication satellites.

Therefore, the ground terminal and satellites of the system 100*c* form a complete communication network allowing the communication with the observation satellites.

The observation system 100*c* is provided by means of non-limitative example only of an observation system in a number of embodiments of the invention, in order to illustrate the various possibilities of communication between the observation satellites and the ground. In other embodiments of the invention, an observation system may comprise only certain elements of the system 100*c*, and/or comprise other suitable elements for allowing the communication between the ground and the observation satellites.

Figure 2:
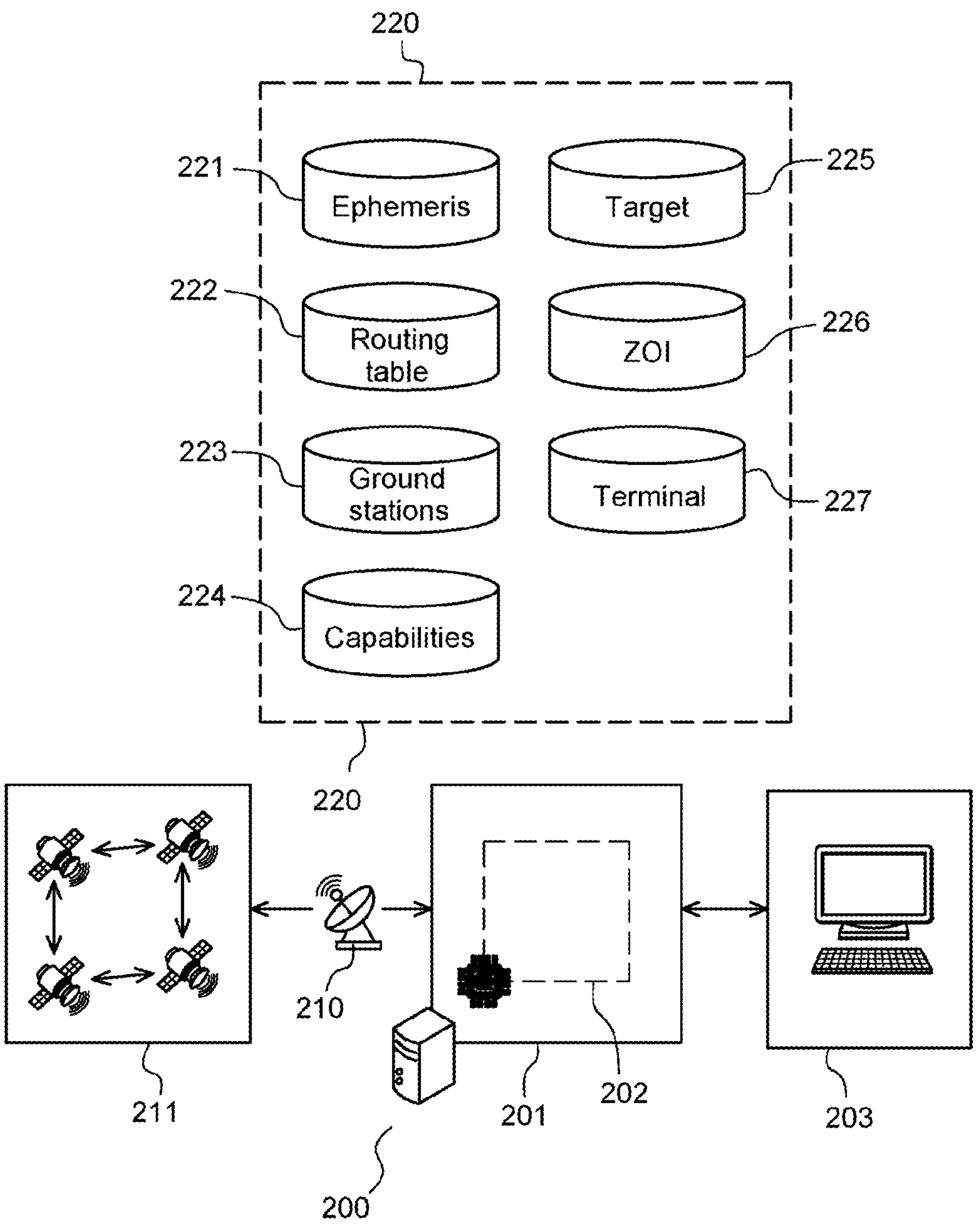
FIG. 2 represents an example of a computing system in a number of embodiments of the invention.

FIG. 2 represents an example of a computing system in a number of embodiments of the invention.

The computing system 200 is a computing system which may be configured to perform an automatic selection of one or more optimal observation satellites to observe a Zone Of Interest (ZOI), and/or one or more targets. The computing system 200 may thus for example be one of the computing systems 100*a*, 100*b* or 100*c*.

Although the computing system 200 is represented in FIG. 2 as comprising a single computing device 201 comprising one or more processing logic 202, according to various embodiments of the invention, the computing system may comprise a plurality of computing devices. The computing system may for example be a ground control station of a satellite constellation, a server, a server farm, a user device having communicating capabilities such as a 5g phone, . . . .

The computing system 200 comprises a communication link 210 with a plurality of observation satellites 211.

The communication link may be formed by any suitable means to communicate with satellites. It may for example comprise an antenna to send information to the satellites.

According to various embodiments of the invention, the link may be direct or indirect, unidirectional or bidirectional, involve one or more of an antenna on ground, other observation satellites and communication satellites, as explained for example with reference to FIGS. 1*a* to 1*c*.

In case of a direct link with an observation satellite, the computing system comprises an antenna and is able to send, and optionally receive, messages directly to or from an antenna of the satellite.

In case of an indirect link with an observation satellite, the computing system communicates with the satellite using intermediary devices, which may comprise for example either a remote antenna on the ground and/or other observation or communication satellites, as shown for example in FIGS. 1*b* and 1*c*.

The use of an indirect communication link allows for communications with the satellite even if it is not in direct contact with the computing system. For example, instructions can be sent to, and data received from satellites that are located on the other side of the Earth.

According to various embodiments of the invention, a communication link may be either unidirectional or bidirectional.

A unidirectional link allows either the ground to send data to a satellite, or a satellite to send data to the ground.

A bidirectional link further allows the computing system to receive data. Examples of data may include observations, from the observation satellites, acknowledgements of reception of transmitted data, and other telemetry from the destination/target satellite. In this case, the computing system is thus able to receive and process the observations.

The observation satellites 211 represent a fleet of one or more satellites that are able to perform observations. The type of observations that the observation satellites can perform may vary between satellites in the fleet and is dependent on the capabilities of each satellite. Such observations may for example comprise photographic observations, detection of the emission of radio signals by objects, or other physical phenomena permitting the detection of objects, and identification of a target. As will be explained in more detail hereinafter, in some of its embodiments, the invention relates to the selection of one or more optimal satellites to optimize the timing of the observation and/or transmission of data. Therefore, the invention is not restricted to any specific kind of observation. According to various embodiments of the invention, the observations performed by the satellites may be observations of objects on the surface of the Earth, of objects in the atmosphere, or of objects in space. Some of the objects may be identified as targets.

In a number of embodiments of the invention, the computing system 200 comprises one or more databases 220.

According to various embodiments of the invention, the databases may have different types and formats. A database may for example be formed by a table, a relational database, an object-oriented database, a columnar database, a wide column database, a key-value database, a hierarchical database, a graph database, a document database, a time series database, etc. . . . . More generally, any database format suitable for accessing and, when applicable, editing data may be used in a number of embodiments of the invention. When more than one database is used, the plurality of databases may have different types and formats.

The databases 200 may be located in the one or more computing devices 201 comprising the one or more processing logics 202, or in other devices, for example remote servers. The databases may also be located partly in the one or more computing devices 201, and partly in further devices. They may be either stored on a single file, or distributed logically, and stored on a single device, or distributed physically. More generally, it can be appreciated that any form of database or databases whose data can be accessed by the one or more processing logics 202 could be implemented. The access to the databases includes read access and may, in some cases, include write accesses.

In a number of embodiments of the invention, the one or more databases comprise an ephemeris database 221. The ephemeris database contains a description of the orbits of the plurality of observation satellites 211. It therefore provides knowledge allowing the calculation and prediction of the exact position of each of the satellites at any given time. The ephemeris database may also indicate what will be the orientations of the satellites at each position and time of their orbits. According to various embodiments of the invention, the ephemeris database may contain one or more of the following:

Orbital parameters, for example in the form of Two Line Elements (TLEs) or as Keplerian parameters (Altitude, inclination). These may be found for example in the form of functions that return the values of parameters as a function of time and/or tables;

Orientation, which may be expressed using Quaternion notation and/or Euler angles;

Mode of the mission/pointing, for example in the form of status codes implying a specific pre-defined orientation such as “Sun pointing” or “Earth pointing”;

Etc. . . . .

In a number of embodiments of the invention, the computing system is able to send to the satellites instructions to modify their orbits, and is accordingly able to modify the ephemeris database 221 to take into account the modifications of the orbit of the satellites. The ephemeris database 221 may more generally be updated at any time an orbit of one of the satellites is modified or corrections need to be applied to the ephemeris data due to factors which may modify the orbit such as atmospheric drag.

In a number of embodiments of the invention, the one or more databases 220 comprise a satellite routing table database 222.

The satellite routing table database 222 is a database that indicates the abilities of each of the satellites 211 to communicate with the other satellites 211.

Therefore, satellite routing table database 222 allows a determination of the options for indirectly communicating with the satellites 211. For example, if the computing system is, at a time t, able to communicate directly with a satellite A but not a satellite B, and the routing table indicates that the satellite A is able to communicate with the satellite B, an indirect communication can be established between the computing system 200 and the satellite B, through satellite A.

The satellite routing table 222 can be static, which means that the connections between the satellites remain fixed. This is for example the case if the orbits of the satellites are synchronized, which means that they follow the same orbit with a phase difference, so that the relative positions of the satellites remain mostly constant.

Otherwise, the satellite routing table 222 can be also be dynamic, if the relative positions of the satellites are not constant (for example, if their orbits are not parallel, or if time period of revolution are not identical).

In a number of embodiments of the invention, the one or more database 220 comprise a ground station database 223.

The ground station database 223 contains descriptors of ground stations, i.e of terminals to which the satellites can send observations and which transmit information from the control center to the satellites. The ground stations may be fixed or mobile ground stations and may be equipped with antennas to receive observations from the satellites. Mobile ground stations may be for example user terminals. The descriptors of the ground stations include a position of the ground station, and may additionally include additional information such as a name of the ground station, the type of antenna, and reception capabilities, the type of ground station, availability status (planned availability, actual availability, maintenance operations, etc. . . . ). More generally, the ground station database may comprise any parameter allowing to ensure that the communication link budget necessary for a satellite to receive instructions and send the observations is complied with. Such parameters may include:

- A transmission and reception Range (transmission and reception window of the grand station);
- Transmission power and antenna gain;
- Reception sensitivity,
- Angular visibility;
- Etc. . . . .

The ground station database may further comprises parameters related to the privacy of communication between the satellites and the database. For example, only certain ground stations may be usable for performing communications of a defined client and/or for a defined level of confidentiality.

In a number of embodiments of the invention, the ground station database 223 allows, in conjunction with the satellite capabilities database 224 and ephemeris databases 221, to determine whether a communication link budget is complied with between a satellite and a ground station.

The ground station database 223 may be static, if no change of the ground station is foreseeable, or dynamic in order to update the descriptors of the ground stations. This database may be edited, for example to add or remove a ground station, or to modify the position of a mobile ground station. The ground station may also be temporarily indicated as unavailable. In a number of embodiments of the invention, the future states of ground stations may be indicated in the ground station database 223. For example, future positions of a mobile ground station whose planned displacement is known can be mentioned in the ground station database 223; a schedule of availability of the ground station may also be mentioned. For example, a future unavailability of a ground station may be specified, if a maintenance of the ground station is planned, or if a weather forecast indicates that future weather condition will not allow an antenna of a ground station to receive signals.

The ground station database 223 therefore allows, in conjunction with the ephemeris database 221, a determination of which ground station can be in communication with which satellite at a given time, and thus which satellite can send observations to the ground and receive information from the control center.

In a number of embodiments of the invention, said one or more database comprise a satellite capabilities database 224.

The satellite capabilities database 224 stores information relative to the capabilities of each of the satellites 211. According to various embodiments of the invention, the capabilities may belong to different types of capabilities, belonging for example to the following categories:

- observational capabilities: this category comprises all the elements relative to what and how each satellite observes. For example, it may comprise the type of observation sensors of the satellites (e.g optical imaging, radio frequency detection, radiation detection, thermal imaging, electromagnetic sensors, etc. . . . ), and/or the sensor features (e.g frequency bands in which the sensor can observe, image resolution, etc. . . . );
- attitude manoeuver capabilities: this category comprises all the satellite parameters relative to the ability of the satellite to perform maneuvers: rotation speed, acceleration capacity, rotational acceleration limits, remain within operational limits of the satellites and its sensors and actuators, etc. . . . .
- communication capabilities: this category comprises all the parameters relative to the ability of the satellite to communicate. For example, it may comprise an ability to communicate with one or more defined ground station, a speed of transmission of information, etc. . . . .
- . . .

The satellite capabilities database 224 allows the use of the individual capabilities of the satellites to optimize satellite selection. In particular, this allows filtering the relevant satellites depending upon their ability to perform the desired observation. For example, such filtering may comprise selecting as relevant satellites only the satellites able to capture image at a defined resolution, detect electromagnetic waves at a defined wavelength, rotate to view a target with under a defined angle of view, communicate with a defined ground station at a minimum speed, etc. . . . . Candidate satellites may for example, as will be explained in more details below be ranked or filtered according to their observational capabilities. For example, two satellites may possess the ability to provide optical images having differing resolutions.

Such selection of satellites may be performed on the basis of one or more parameters belonging to one or more categories.

The satellite capabilities database 224 may be either static or dynamic. A dynamic database may be updated to comply with the modifications of the satellite capabilities. The modifications of the satellite capabilities may be of various kinds. For example, the satellite firmware may be upgraded to add additional capabilities such as an improve resolution. Certain capabilities may also be removed from the satellites, for example in case of sensor failures.

The one or more database 220 may also comprise mission-related databases.

For example, in a number of embodiments of the invention, the one or more database 220 comprises a target database 225.

A target can be defined as an object of specific interest. A target may be either defined as a defined instance of an object (for example, a defined aircraft, ship etc. . . . ), or a type of objects (for example a vehicle of a specific type, such as a plane, an Airbus A320, a fishery boat, etc. . . . ).

Possible targets may include objects which are either terrestrial, maritime, airborne, or spatial and which possess features allowing for identification by one or more sensors on one or more observation satellites.

The target database 225 lists the known targets. A target may be defined by one or more identification parameters comprising one or more of an estimated position, an altitude, an identifier which may be a name, a type, a size, a speed, and identification parameters. Any other relevant parameters may be used. A combination of values of identification parameters can be defined as an "identification signature".

This database allows identifying targets from objects, by comparing the values of the identification parameters of an object to those of the targets present in the database.

Identification parameters encompass all the parameters defining how a target can be identified. They may for example comprise:

- the type of sensors that are able to detect the target;
- one or more images of the target, to compare with images captured from the satellites;
- frequency bands in which the target emits electromagnetic waves;
- image features, which may be as well characteristics of the image itself, or features defining the content of the image;
- Types of electromagnetic radiation;
- Electromagnetic radiation signature;
- Radiation signature;
- Heat map;
- etc. . . . .

The target database 225 may be used in different ways. For example, it can be used to verify which targets are present in a defined area. When a new request for the detection of a new target is received, the new target can be added in the target database 225. Conversely, when observing the ZOI, an alert can be raised if an object that corresponds to none of the known targets is found.

The target database 225 may also contain descriptors of non-target objects, that is to say objects that can be identified but are not considered as targets.

In a number of embodiments of the invention, the one or more database 220 comprises a database 226 of Zones Of Interest. For the sake of intelligibility, the Zones Of Interest can be abbreviated as "ZOI", and the database 226 called "ZOI database".

The ZOI database 226 stores Zones Of Interest wherein the presence of targets can be verified.

The ZOIs may be either defined as approximately 2D zones, on the surface of the Earth, or 3D zones, that may be either defined from the surface of the Earth, or in the atmosphere or in space. 2D and 3D regions may be defined in any suitable coordinate geographic reference frame.

The ZOIs can be defined in virtually any means allowing to define a 2D zone on the surface of the Earth, or in 3D. 3D zones may be defined for example using 3D points, or a 2D zone associated with altitude information (which itself be defined for example as a minimum/maximum altitude, or an altitude profile). For example, the ZOIs can be defined by series of polygons.

When an observation request using a ZOI is received, it may be based on the known ZOIs, or define a new ZOI where observations need to performed. In such case, the new ZOI can be added in the database. ZOIs which are no longer in use may be removed from the database.

In a number of embodiments of the invention, the one or more database 220 comprises a database customer terminal database 227.

The customer terminal database identifies the terminals of the users of the system. In particular, it may identify the terminals in which the observations shall be received.

Each terminal may be associated to one or more of a position, communication capabilities, processing capabilities, and a customer identifier.

This allows the identification of where the observation results need to be sent. Moreover, it allows determining which satellite can communicate with which customer terminal.

The computing system further comprises one or more processing logic 202.

According to various embodiments of the invention, a processing logic may be a processor operating in accordance with software instructions, a hardware configuration of a processor, or a combination thereof. It should be understood that any or all of the functions discussed herein may be implemented in a pure hardware implementation and/or by a processor operating in accordance with software instructions. It should also be understood that any or all software instructions may be stored in a non-transitory computer-readable medium.

The one or more processing logic may be located within one or more computing devices 201. The one or more processing device may comprise input/output units 203, for example a screen, a tactile screen, a keyboard and/or a mouse. The input/output interfaces may allow a user to send observation requests, but also to have an overview of the mission. For example, the screen may represent all the observation satellites, and highlight the satellites that are selected, present a timeline of the observation missions, etc. . . . .

In the FIG. 2, the one or more computing device 201 is represented as a personal computer. However, this representation is purely illustrative, and other computing devices may be used in the invention, such as servers, server farms, tablets or smartphones. A computing device equipped with tactile interface may be used to provide to a user an interactive experience. For example, a user may be able to cause an observation in a ZOI by clicking on the zone on a map on a tactile screen. Depending on the mode of the mission, for example, a user may define with a single click a predefined ZOI shape centered on the coordinate selected on the map.

According to various embodiments of the invention, the one or more processing logic may be configured to select an optimal satellite to observe a Zone Of Interest and/or perform target identification and tracking. Examples of operations performed by the one or more processing logic 202 are for example presented with reference to FIGS. 3*a* and 6.

Figure 3A:
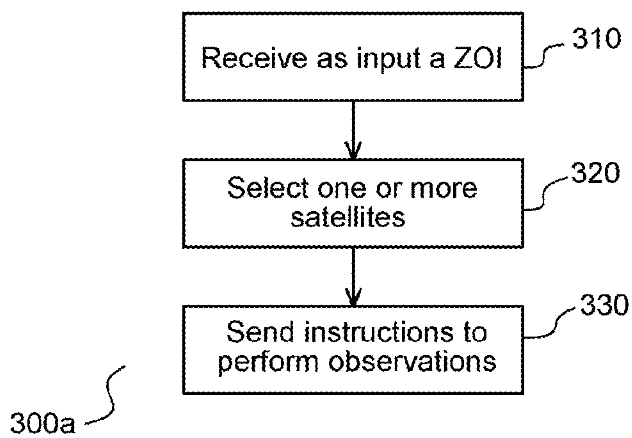
FIGS. 3*a* and 3*b* represents two examples of a computer-implemented method to select an optimal observation satellite in a number of embodiments of the invention.
Figure 3B:
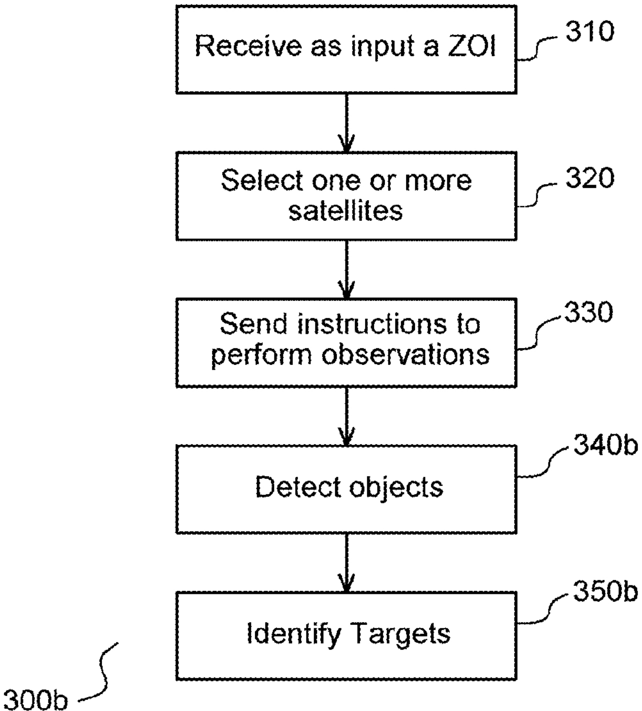

FIGS. 3*a* and 3*b* represents two examples of a computer-implemented method to select an optimal observation satellite in a number of embodiments of the invention.

The method 300*a* represented in FIG. 3*a* is a computer-implemented method that can be for example executed by the one or more processing logic 202.

The method 300*a* comprises a first step 310 of receiving as input a Zone Of Interest. For the sake of intelligibility, a Zone Of Interest can be simply referred to as "ZOI".

The ZOI can be described in many different ways, as explained above with reference to FIG. 2. When the method is implemented in the system 200, the ZOI can be for example received as a key, or reference to one of the ZOIs present in the ZOI database 226, or a complete descriptor of the ZOI can be received. In the latter case, if the descriptor of the ZOI corresponds to none of the ZOIs present in the database 226, a new entry can be added in the database.

The ZOI can be obtained in different ways. For example, it may be obtained from a user input, a surveillance event, or as part of the tracking of target. In such case, a ZOI can be for example defined around a position to observe, or to cover a defined search zone. For example, a ZOI can correspond to a zone wherein observations are desired, such as zones wherein illegal fishing is suspected for example.

In a number of embodiments of the invention, a ZOI can be received in to track a target. For example, the ZOI can correspond to an estimated position of a target. Examples of determinations of ZOIs to track a target are provided below, with reference to FIG. 6.

The method 300*a* further comprises a second step 320 of selecting one or more satellites among said plurality of observation satellites based at least on a minimization of at least one parameter selected in a group of parameters comprising, for a satellite:

- an observation time $T_{obs}$, at which each of said plurality of satellites is able to observe the one or more targets or the Zone Of Interest;
- a delivery time $T_{del}$ at which an output of the observations from the satellite can be transferred to a ground receiver;
- difference between said delivery time $T_{del}$, and said observation time $T_{obs}$.

According to various embodiments of the invention, the ground receiver may be either:

- the ground station, or antenna which is in direct connection with the satellite, and which first receives the output of the observation from the satellite;
- the final receiver of the output of the observations (final client).

According to various embodiments of the invention, the step 320 may consist in minimizing one of the observation time, delivery time and difference between the observation time and the delivery time, or a combination of these parameters.

The values $T_{obs}$ and $T_{del}$ are calculated for each satellite, then the one or more satellite that minimize the parameters are selected. The FIGS. 4*a* and 4*b*, and the corresponding description below represent examples of calculation of the values $T_{obs}$ and $T_{del}$.

Each of these three parameters is of particular relevance for the detection of targets:

- minimizing the observation time $T_{obs}$, is useful to ensure that the observation is performed as early as possible. This is for example useful for observing targets whose future trajectory is unknown: the earlier the observation, the higher the chances of observing the target at the estimated position. In some case, it may also be desirable to observe the target in a certain state. The difference between $T_{obs}$ and the time $T_{tasking}$ at which the request is sent is called "time to first observation";
- minimizing the delivery time $T_{del}$, at which the satellite is able to transfer the output of its observations to a ground receiver, is useful to retrieve the observation as early as possible, which is desirable to implement any further action as early as possible. The difference between $T_{del}$ and the time $T_{start}$ at which the selection is performed is sent is called "time to first response". It is worth noting that, according to various embodiments of the invention this time may either correspond to the time at which the satellite transfers the output of the observation to the ground, or the time at which the output of the observation is transferred to the final receiver, thereby taking into account the time of transfer of information between the ground station that receives the output of the observation form the satellite, and the final receiver;
- minimizing the difference between said delivery time $T_{del}$, and said observation time $T_{obs}$ allows ensuring that the observation were not performed too long before they are received, so that the observation relates to a recent state of the targets. This difference is called "Age of information".

In a number of embodiments of the invention, the delivery time $T_{del}$ is the earliest time at which the satellite is able to transfer the output of its observations to the ground.

Stated otherwise, this means that the delivery time $T_{del}$ is the earliest time at which the observations are transferred from the satellite to a ground station, and thus received on ground.

This allows selecting a satellite to minimizing the time at which the observations are received on ground.

In a number of embodiments of the invention, wherein the delivery time $T_{del}$ is the earliest time at which the output of the observation from the satellite can be received by a final receiver.

Stated otherwise, in this case the delivery time $T_{del}$ is not necessarily the time at which the observations are received on ground, but the time at which the observations are received by a final receiver. For example, if the observations are received by a ground station, which then sends them to a user terminal which is the final receiver, the delivery time $T_{del}$ is the earliest time at which the observations can be received by the user terminal.

This allows taking into account the time of transmission between the ground stations and user terminal. For example, it may be more beneficial to select a satellite that is able to send the observations to a first ground station that instantly sends the observation to the user terminal, rather than a satellite that is able to send earlier the observations to a second ground station, if this second ground station is an isolated ground station, that will take time to send the observations to the user terminal, so that the final delivery time to the user terminal is later.

The method 300*a* further comprises a third step 330 of sending to said selected one or more satellites instructions to perform one or more observations of said Zone Of Interest.

Thus, the observations can be actually performed, and sent to a terminal on ground to be analyzed.

According to various embodiments of the invention, many different kinds of observations can be performed, depending upon the observational capabilities of the satellites and/or the types of observations desired. For example, one or more of the following types of observations may be performed:

optical image capture;
radiofrequency detection;
radiation detection;
thermal imaging;
electromagnetic sensing;
. . .

The method 300*a* therefore allows using for the observation one or more optimal satellites that are able to perform the observations as soon as possible and/or transmit the output of the observations as early as possible and/or send the output of the observation as early as possible after the observations. Furthermore, optimal satellites can be selected without the intervention of an operator.

According to various embodiments of the invention, the observations can be used in different ways. For example:

The presence, or absence of a target in a ZOI can be assessed;
The presence of an unknown or unidentified object in a ZOI can be assessed.
In such case, this object can be added in the target database 225.

Depending up on the detection, different actions can be performed. For example, an alarm can be raised (for example if a target or unknown object is identified, or conversely if a target is not found); a target can be tracked; target interception can be engaged; etc. . . . .

In a number of embodiments of the invention, said selection further depends upon a communication link budget, which defines an amount of information that can be transmitted by the satellite to the ground. The selection may therefore comprise selecting satellites that whose communication link budget is sufficient to send the output of the observations to the ground.

The communication link budget for a satellite may be calculated as a function of:

The communication capabilities of the satellite (and more specifically the characteristics of its antenna);
The characteristics of the antenna of a ground station;
The distance between the satellite and the ground station;
The relative orientations of the antennas of the satellite and the ground station;
The communication time frame wherein the satellite is able to communicate with the ground station.

These elements allow determining a communication bitrate and a SNR, then verifying if the SNR is acceptable, and if the communication bitrate is sufficient to send the output of the information during the communication time frame. They may be for example be found in the satellite capabilities database 224, and the ground station database 223.

Of course, these examples are provided by means of example only of determination of the ability of a satellite to send observations on the ground, and, more generally, any suitable element allowing to select satellites that are able to communicate enough data to the ground to send the output of the observations can be used.

In a number of embodiments of the invention, said selection comprises determining the satellites that comply with constraints relative to the observation time ($T_{obs}$).

Stated otherwise, only satellites that comply with constraints relative to the observation time can be selected. The constraints may consist for example in having an observation time higher than a minimum observation time, lower than a maximum observation time, inside a time window, or as close as possible to a target observation time.

This allows ensuring that the observation time will comply with certain constraints. In particular, the constraints of observation time are useful when a plurality of interrelated observation need to be performed, which is for example the case when a plurality of successive observations need to be performed.

Examples of use of the observations are for example provided with reference to FIG. 3*b*.

The method 300*b* represented in FIG. 3*b* is a computer-implemented method that comprises all the steps of the method 300*a*, and: a fourth step 340*b* of detecting one or more objects in the output of said one or more observations.

Stated otherwise, objects present in the ZOI are detected based upon the observations performed by the selected satellites.

The output of the method may therefore be a list of descriptors of objects.

In a number of embodiments of the invention, the method further comprises a fifth step 350*b* of identifying one or more targets from said one or more objects.

Sated otherwise, targets are identified among the detected objects based upon the characteristics of the detected objects. The output of the method may therefore be detection of the absence or presence of target, or the descriptors of the targets themselves.

This allows detecting the presence of targets in the ZOI. According to various embodiments of the invention, any subsequent use of such detection can be performed, such as raising an alarm, causing further observation or causing target interception.

According to various embodiments of the invention, the steps 340*b* and 350*b* may be performed either by the computing system 201/the one or more processing logic 202 themselves, or one or more further devices to which the output of the observation are sent, such as the 5G phone 113*c*, or the mobile SATCOM receiver 114*c* of the system 100*c*.

Stated otherwise, the observations may be sent to and processed by the computing system 200, or a further computing system to which the output of the observations are sent, for example a client computing device, or a user terminal. In a number of embodiments of the invention, the object detection step 340*b*, and the target identification step 350*b* may be performed by different computing systems.

The fourth step 340*b* of detecting one or more objects in the output of said one or more observations consists in detecting the objects present in the ZOI based on the observations. Any suitable means for detecting objects may be used depending upon the type of observations. For example:

If an observation consists in an optical image capture, the output of the observation is an image. Therefore, any type of object detection in image may be used;
If an observation consists in radiofrequency detection, the output of the observation may be radiofrequencies, possibly associated with other parameters such as the intensity of the emission, its position, etc. . . . or any parameter which contributes to the formation of a unique identifying signature In such case, an object can be detected by the simple detection of a radiofrequency, or the detection of a radiofrequency above an intensity threshold;

Etc. . . . .

At step 340*b*, the object detection may be either limited to specific object types/features, or extended to anything that is found in the output of the observation.

In a number of embodiments of the invention, the detected objects may be associated with the values of one or more parameters. For example, a detected object may be associated with values of one or more of the following parameters:

a position of the object;
a size of the object;
a shape of the object;
a color of the object;
a spectral response of the object;
an object type;
a frequency of emission of the object;
an intensity of emission of the object;
etc. . . . .

The parameters may of course depend upon the type of detection. For example a shape of the object will be more likely used in case of optical imaging, while a frequency and intensity of emission will be more likely used in case of radiation detection, or electromagnetic sensing.

As noted above, the output of the method may be a list of the detected objects, or a further target identification step may be performed to detect targets among objects.

In a number of embodiments of the invention, the target identification at step 350*b* relies on a comparison between the values of parameters of the object, and values of the same parameters of target descriptors, and/or non-target object descriptors.

For example:

the shape of a detected object can be compared to the shape of target descriptors to detect whether the object is one of the targets;
the object type can be compared to target types;
the frequency of emission of a detected object can be compared to frequencies of emission, or range of frequency of emission of targets, to verify whether the frequency of emission corresponds to a specific target;
etc. . . . .

Conversely, the same operations can be performed on descriptors of non-target objects, to classify a detected object in a non-target entity.

A target descriptor can be associated with a target type (for example, “fishing boat”, “jet aircraft”, etc. . . . ), or a target name (for example, an identifier of a specific vehicle) so that the target can be identified when it is matched to a target descriptor.

In a number of embodiments of the invention, the identification step 350*b* comprises identifying said one or more targets if values of parameters of said one or more objects match values of parameters of descriptors of targets.

Stated otherwise, when an object is detected, the values of one or more parameters of the objects are compared with the values of the corresponding parameters of the descriptors of targets (e.g the shapes, object types, frequencies of emissions, etc. . . . may be compared) in a set of target descriptors. If the values of the parameters of the object match the values of the corresponding parameters of a target descriptor, a target is detected. This matching may be determined in different ways. For example, it may be an exact matching of the values which is complied with in case of strict equality, but also;
a matching associated with a pre-defined limit, wherein the values are considered as matching if their difference is below the limit;
a range matching, wherein a value is considered as matching if it falls within a defined range.

In general any match which is not an exact match allows identification of objects in the presence of measurement noise and other measurement limitations.

This allows detecting targets corresponding to any known target, or target type, found in the database.

In a number of embodiments of the invention, the identification step 350*b* comprises identifying said one or more targets if values of parameters of said one or more objects do not match values of parameters of any descriptor of a non-target objects.

Stated otherwise, a set of descriptors of non-target objects, that is to say objects that can be identified as not being targets, is considered. For example, in an exemplary embodiment for the detection of intruder aircraft, civilian aircraft will not be considered as target. Therefore, the target database can comprise descriptors of various commercial airline aircraft (e.g. Airbus A320, Boeing 737, etc. . . . ) as being non-target objects. Thus, any object which is identified as belonging to a non-target object type will not be considered as a target. Conversely, any detected object that does not belong to any non-target type will be considered as a target.

This allows detecting as a target any unexpected object that does not correspond to any of the non-target descriptors.

Of course, the comparisons to target and non-target descriptors can be used simultaneously: an object can therefore be considered as a target if it matches a target descriptor, or if it does not match any of the non-target descriptors.

The descriptors of target objects, and non-target objects may be obtained in different ways.

For example, one or more descriptors of target or non-target objects may be received as input of the method, in order to perform the comparisons.

The descriptors of target or non-target objects may also be found in a database such as the database 225. Such a database can be updated during the execution of the method. For example, of a target descriptor is received as input, it can be added to the database. Conversely, if a target is detected because it does not correspond to any non-target object in the database:

a corresponding descriptor of a target object can be added in the database;
a user can be requested to confirm that the object is or is not a target; if the object is not confirmed as being a target, the corresponding descriptor can be added as a non-target object.

When the one or more descriptors of target or non-target objects are received as input of the method, the descriptor of the one or more targets or non-target objects may be formed of a reference of the descriptors in the target database 225, or a custom definition of the target or non-target objects using the same parameters as those discussed with reference to the target database 225. If the target or non-target is not present in the target database, it can be added in the target database 225.

In a number of embodiments of the invention, the selection of satellites at step 320 depends upon observational capabilities of the satellites.

The observational capabilities of the satellites can for example be found in a satellite capabilities database such as the database 224, which indicates for each satellite at least one observational capabilities belonging to at least two different types of observational capabilities.

This allows selecting the satellites, not only based upon the target times, but also based upon their ability to observe specific objects.

The observational capabilities may influence the selection of the satellites in different ways.

In a number of embodiments of the invention, one or more descriptors of one or more targets or non-target objects comprise an indication of how the one or more targets can be observed. This indication is matched with the observational capabilities of the satellites.

This allows adapting the selection of the satellite to the specificities of the objects to observe.

As explained above, the descriptors may be received as input. They may also be found in a target database such as the database 225. In the latter case, the selection of the satellite can for example be performed in order that observational capabilities of the satellites allow observing the largest possible number of targets from the database.

In other embodiments of the invention, the observational capabilities of the satellites are taken into account, but no descriptors of targets. In such case, the observational capabilities of the satellites can be matched with an indication of how a general type of targets can be observed, or to perform a general type of observation.

The matching between satellites and how target or target types can be observed can be performed in different ways.

For example candidate satellites can be filtered depending upon their observational capabilities To provide a concrete example, each satellite may be able to observe electromagnetic waves in a specific frequency band which may be indicated, for each satellite, in the satellite capabilities database 224. The description of how the one or more targets, or target types, can be observed may include an indication of a frequency, or a frequency band, at which the target is expected to emit. The selection can thus be restricted to the satellites able to observe in a frequency band that encompasses all the frequencies in which the target can emit, or a defined frequency spectra (e.g the ability of a satellite to observe in the visible or infrared spectra, for instance)

More generally, in a number of embodiments of the invention, the selection of the satellite at step 320 comprises filtering the observation satellites whose observational capabilities match said indication of how the one or more targets or non-target objects can be observed.

Stated otherwise, the principle explained above can apply to all of the observations types: the selection of the satellites can is restricted only to the satellites whose observational capabilities match the expected ways of observing the target.

This allows ensuring that the selected satellites will be able to accurately observe the target.

The matching between satellites and how target or target types can be observed can also be performed by ranking the satellites depending upon their observational capabilities.

The ranking may therefore be based on a combination of the observational capabilities, and other parameters, such as the time to observation and the age of information.

The ranking may for example be based upon the expected precision of the observations. For example, two satellites may possess the ability to provide optical images having differing resolutions. The quality of the output data may be used to influence the selection criteria in addition to others, such as the time to observation and the age of information.

The satellites may be more generally ranked according to a cost function, which may comprising a one or more of the following parameters:

- client-side parameters:
  - The urgency of the mission;
  - The relative importance of the Time to first observation, Age of information and Time to first response;
  - The repetition of observation—defines whether the observation is a one-shot observation, if a target/ZOI should revisited, or a target tracked;
  - Confidentiality: may limit the downlinks to specific ones;
- Operator parameters:
  - Mechanical capabilities of the satellites:
    - Free axis pointing ability of a candidate satellite;
    - Agility—the speed with which the satellite can point in the desired direction;
  - Observational capabilities of the satellites;
  - Compliance with communication link budget;
  - Customer prioritization. Multiple trade-offs possible depending on SLAs:
    - Degrade performance on one customer (e.g. lower resolution data) in order to provide an observation at all for a second customer.
    - Maintain high quality data for one customer whilst being unable to fulfill request (either at all or within time constraints) for another.
  - Minimize wear/lifetime reduction on a particular satellite by retargeting only if the stress levels of doing so are within certain thresholds.
  - Prioritize missions where the higher priority customer has priority.

The cost function may be defined in different ways. It may be for example a weighted average of one or more of the above mentioned parameters.

Once a target is identified, different actions may be performed. For example:

- An alarm may be raised;
- A tracking of the target may be engaged;
- Interception actions may be engaged;
- Trigger recovery of external data related either to the target or to the zone in which the target is located;
- Delivery of data to a specific client;
- Notification sent to a client of the target identification;
- Launch the tasking of one or more satellite to make an observation based on this identification;
- . . .

Figure 4A:
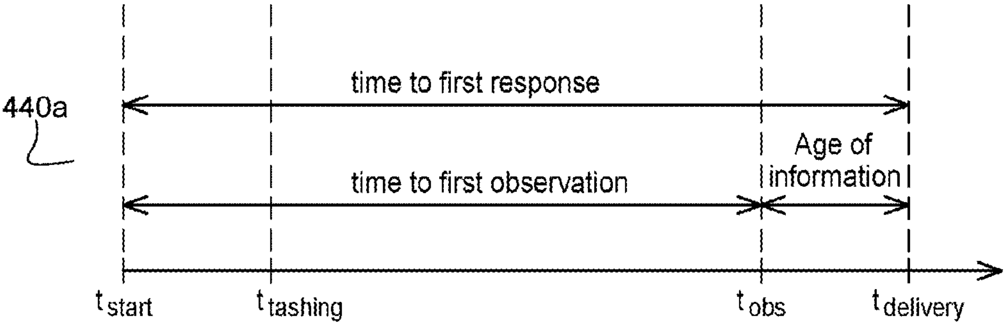
FIG. 4*a* represents a first example of determination of an observation and a delivery time of a satellite.
Figure 4A:
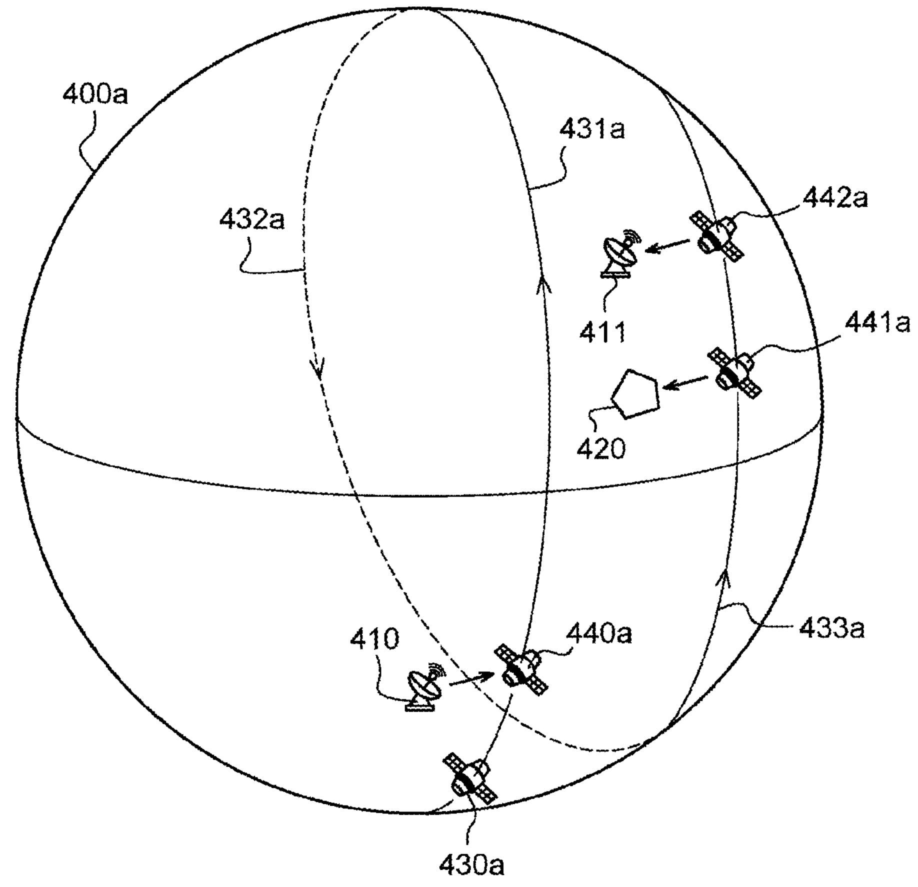

FIG. 4*a* represents a first example of determination of an observation and a delivery time of a satellite.

As explained above, the selection of the one or more satellites to perform an observation are based on the values of an observation time $T_{obs}$, and a delivery time $T_{del}$. The FIG. 4*a* provides a concrete example of how these values can be determined, for a single satellite, without any communication between satellites.

The FIG. 4*a* represents the trajectory of a satellite around Earth 400*a*, and a timeline 440*a* that represents the successive times of interest.

The satellite 430 follows its orbit 431*a*, 432*a*, 433*a* around the Earth:

In order to perform an observation, and send the output of the observation:

1) The decision to perform the observation, and choice of the satellite are performed at $T_{tasking}$;

2) The satellite receives an instruction to perform the observation from a first ground station 410. This occurs at a tasking time $T_{tasking}$;

3) The satellite performs the observation of a ZOI 420. This occurs at an observation time $T_{obs}$;

4) The satellite sends the output of the observation to a second ground station 411. This occurs at a delivery time $T_{del}$.

In the example of FIG. 4*a*, where the mission consists of observing the ZOI 420:

the satellite 430*a* must first follow the trajectory 440*a* until point 440*a* to be able to establish a communication with a ground station and receive the mission instructions, in this example the station 410;

then the satellite 430*a* must follow the trajectory 431*a*, 432*a*, 433*a* until point 441*a* to be able to perform an observation of the ZOI 420. The section 432*a*, represented by a dashed line, represents the part of the trajectory that occurs on the hidden face of the Earth;

the satellite 310 must finally follow the rest of trajectory 433*a* until point 442*a* to be able to establish a communication with a ground station, in this example the station 411, and send the output of the observation.

$T_{tasking}$, $T_{obs}$ and $T_{del}$ are thus the earliest times at which the satellite can respectively receive the instructions, perform the observation, and deliver the output of the observation. $T_{start}$ represents the time at which the satellite is selected (at the start time $T_{start}$, the satellite is at the position 430*a*).

It can thus be appreciated that, depending upon the trajectory/orbit of a satellite, the times $T_{tasking}$, $T_{obs}$, $T_{del}$ can be significantly different, let alone that, the conditions of execution of the whole may simply not occur for some satellites (for example if they never approach ZOI 420).

The graph 440*a* shows the four times $T_{tasking}$, $T_{tasking}$, $T_{obs}$ and $T_{del}$, as well as:

The difference $T_{obs}-T_{start}$, called "Time to first observation";

The difference $T_{del}-T_{obs}$, called "Age of information";

The difference $T_{del}-T_{qstart}$, called "Time to first response".

One of the principles of the invention therefore consists in determining the times $T_{obs}$, $T_{del}$ for some or all of the satellites 211, and selecting one or more satellites that minimize a cost function comprising at least one of the three differences listed above.

It can be observed that, in this example, the selection of the satellite 430*a* implies a long difference $T_{obs}-T_{start}$, that is to say a long "Time to first observation".

According to various embodiments of the invention, the station 410 may be selected either among all the possible ground stations.

In other embodiments of the invention, the station 411 may be selected among a limited list of ground receivers received as input.

This allows restricting the reception of the output of the observations to a defined list of ground receivers, and selecting the optimal satellite to limit the time to first response and/or the age of information under this constraint.

Restricting the reception of the output of the information to a defined list of ground receivers can be useful, for example for privacy purposes, if the defined list of ground receivers correspond to trusted ground receivers.

In the example of FIG. 4*a*, a single satellite is selected in order to perform a single observation.

However, in other examples, a plurality of successive observations may be performed, and a plurality of satellites may be selected for said plurality successive observations respectively (possibly, a same satellite may be selected for more than one observation).

This allows performing a joint optimization of the selection of satellites for the plurality of observations. The joint selection of the satellites may be performed to optimize different parameters, for example by optimizing a cost function as discussed above.

Figure 4B:
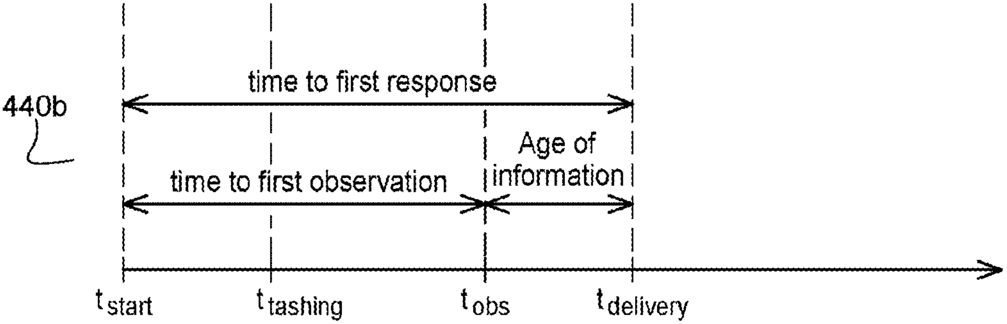
FIG. 4*b* represents a second example of determination of an observation and a delivery time of a satellite.
Figure 4B:
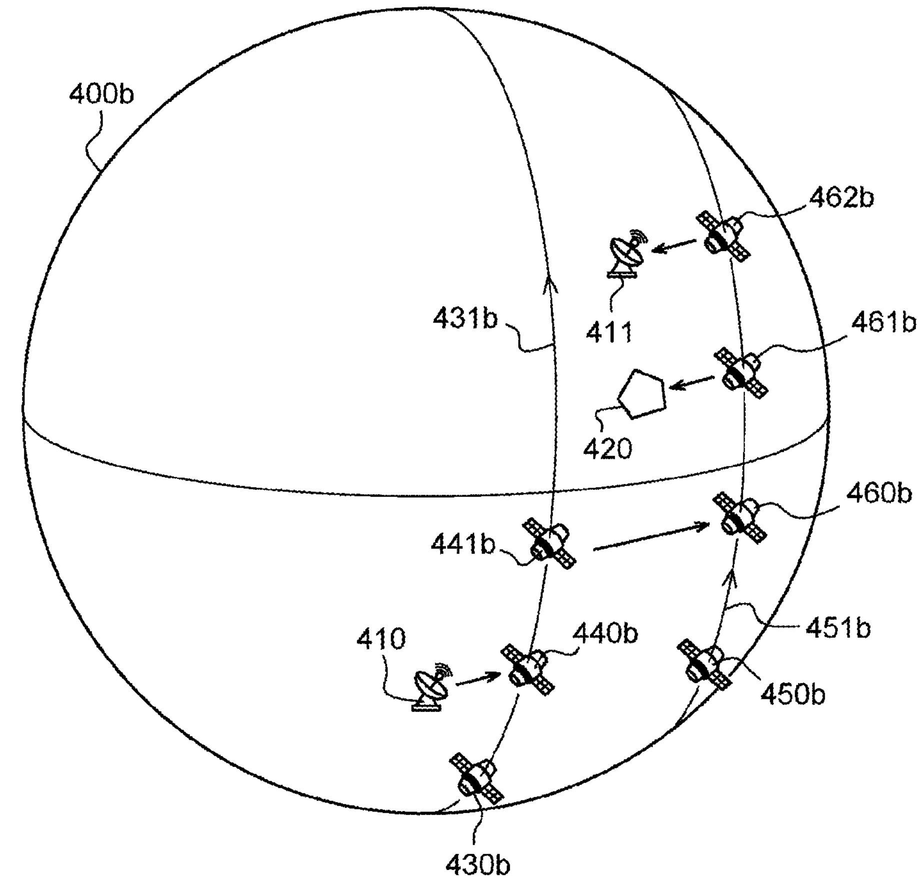

FIG. 4*b* represents a second example of determination of an observation and a delivery time of a satellite.

In a number of embodiments of the invention, the determination of one or more of the observation time $T_{obs}$ and the delivery time $T_{del}$ takes into account a communication between the selected satellite and at least one other satellite.

Stated otherwise, the determination of the observation time $T_{obs}$ and/or the delivery time $T_{del}$ is performed by considering not only direct communication between the ground and a satellite, but also communications between the satellites.

This allows taking into account the inter satellite communication to further optimize the observation time, the delivery time and/or the difference between the observation time, the delivery time.

The FIG. 4*b* illustrates this based on an example similar to the FIG. 4*a:*

The FIG. 4*b* represents the Earth 400*b*, and a timeline 440*b;*

Like in the example of FIG. 4*a*, instructions are sent by the ground station 410 to observe the ZOI 420, then send the observations to the second ground station 411.

However, unlike the example of FIG. 4*a*, two satellites are considered:

a first satellite 430*b* which follows the trajectory 431*b*, identical to the trajectory 431*a;* a second satellite 450*b*, which follows the second trajectory 451*b*.

The first satellite 430*b* follows the trajectory 430*b* until the point 441*b* (identical to point 441*a*), where it can receive instructions from the first ground station 410 at the time $T_{tasking}$.

Then, the first satellite 430*b* follows the trajectory 431*b* until point 441*b*, while the second satellite 450*b* follows the trajectory 451*b* until point 460*b*. Then, the first satellite 430*b* can send the instructions to the second satellite 450*b*.

The second satellite 450*b* then follows its trajectory 451*b:* until point 461*b*, from where it can observe the ZOI 420;

then until point 462*b*, where it can send the observations to the second ground station 411.

Therefore, in this example, the times $T_{obs}$ and $T_{del}$ occur much earlier than in the example of FIG. 4*a*, because, while in FIG. 4*a* the satellite 430*a* had to perform a complete rotation around the Earth before being able to observe the ZOI 420, in the example of FIG. 4*b* the communication between the satellites 440*b* and 460*b* allow a much earlier observation by the satellite 460*b*.

This example exemplifies the benefits of using inter satellite communication for the tasking.

However, the inter-satellite communication is not restricted to this example. For example, the communication can involve more than two satellites, and can also be used for the delivery of the output of the observations: the selected observation satellite can send the output of the observation to one or more other satellite, that then send the output of the observation to the ground, in order to be able to deliver the observations before the selected observation satellite is in position to communicate with a ground station, and thus reduce the delivery time $T_{del}$.

The ability of the satellites to communicate can for example be determined using the satellite routing table 222, or re-calculated from the ephemeris database 221 and the satellite capabilities 224 (and more specifically satellite communication capabilities).

Figure 5:
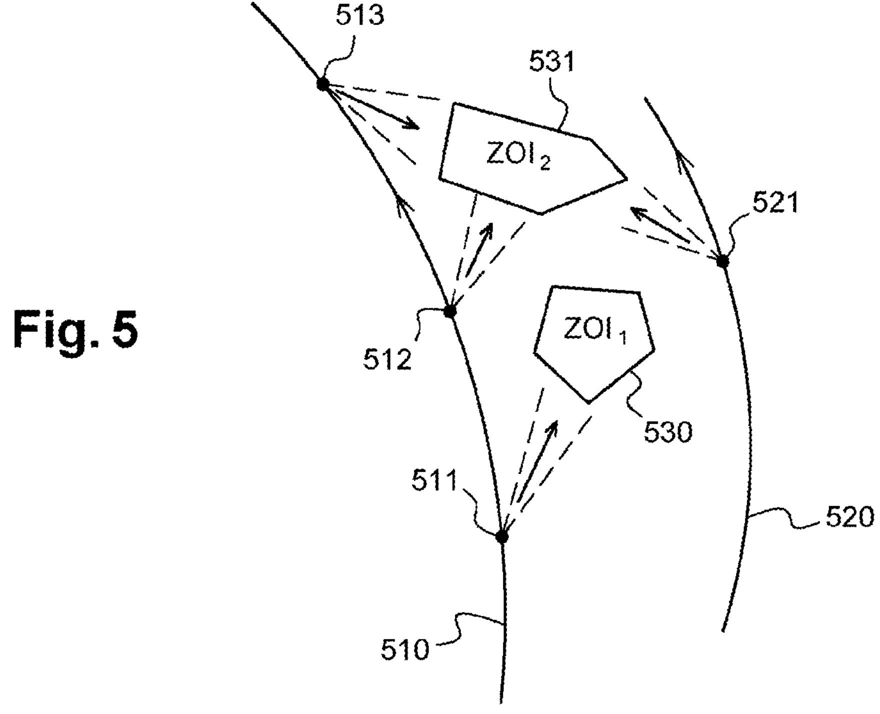
FIG. 5 represents a plurality of examples of observations of ZOIs by observation satellites in a number of embodiments of the invention.

FIG. 5 represents a plurality of examples of observations of ZOIs by observation satellites in a number of embodiments of the invention.

In the example of FIG. 5, a first satellite follows the trajectory 510, and a second satellite follows the trajectory 520. Two ZOIs 530 and 531 need to be observed.

In a number of embodiments of the invention, the satellite are able to modify their orientation when following their orbit, in order to observe the ZOIs at different times and/or from different angles.

For example, the first satellite can observe the ZOI 530 with a first observation from the point 511, then observe the second ZOI 531 from the point 512 with the same first orientation, then observe the second ZOI 531 from a point 513 with a second orientation. Meanwhile the second satellite can observe the ZOI 531 from the point 521 with a third orientation.

The ability of the satellites to observe the ZOIs at different times under different orientations can be determined for example using databases such as the ephemeris database 221 and the satellite capabilities database 224 (and more specifically the manoeuver capabilities).

Therefore, the selection of the satellites can be performed to enhance the ability of the satellites to observe the ZOIs at certain times and/or from certain angles of observations. The selection of the satellites may consist in a selection of a single satellite for a performing a single observation and/or a joint selection of one or more satellites to observe one or more ZOIs at different times and/or angles. For example, the joint selection may consist in:

- observing a same ZOI at different times and/or angle, to observe the evolution of the zone and/or obtain a more complete observation of the zone;
- observing a plurality of ZOIs at successive times, for example to track the expected positions of a target.

Figure 6:
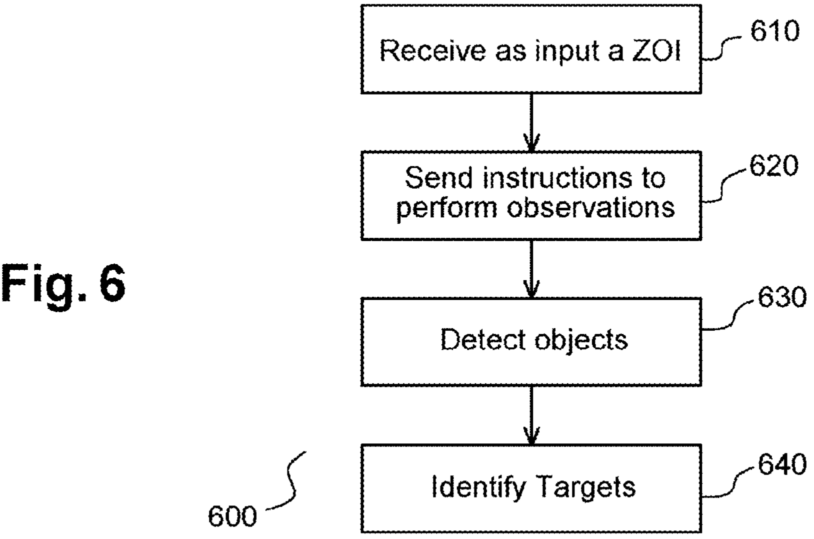
FIG. 6 represents an example of a computer-implemented method to identify one or more targets in a number of embodiments of the invention.

FIG. 6 represents an example of a computer-implemented method to identify one or more targets in a number of embodiments of the invention.

The method 600 represented in FIG. 6 is a computer-implemented method that can be for example executed by the one or more processing logic 202.

The method 600 comprises a first step 610 of receiving as input a Zone Of Interest.

The step 610 is similar to the step 310 of the methods 300*a* and 300*b*.

The method 600 further comprises a second step 620 of sending to one or more observation satellites belonging to said plurality of observation satellites instructions to perform one or more observations of said Zone Of Interest.

The step 620 is similar to the step 310 of the methods 300*a* and 300*b*.

The method 600 further comprises a third step 630 of detecting one or more objects in the output of said one or more observations.

The step 630 is similar to the step 340*b* of the method 300*b*.

The method 600 further comprises a fourth step 640 of identifying one or more targets from said one or more objects.

The step 640 is similar to the step 350*b* of the method 300*b*.

The method 600 therefore allows detecting the presence of targets in the ZOI. According to various embodiments of the invention, any subsequent use of such detection can be performed, such as raising an alarm, causing further observation or causing target interception.

The method 600 allows an automatic, and therefore more efficient, detection of targets in the ZOI. As will be demonstrated below, the method 600 also allows a more efficient tracking of the targets.

Similarly to the embodiments of the method 300*b*, according to various embodiments of the invention, the steps 630 and 640 may be performed either by the computing system 201/the one or more processing logic 202 themselves, or one or more further devices to which the output of the observation are sent, such as the 5G phone 113*c*, or the mobile SATCOM receiver 114*c* of the system 100*c*.

It is worth noting that, in the method 600, when more than one observation satellite is available, the one or more satellite that will actually perform the observations can be selected in many different ways. The selection step 320 may be applied, as well as many other selection types.

For example, the one or more observation satellites may be selected according to one or more of the following parameters:

- current and planned satellite availability;
- observation capabilities;
- trajectory of the satellite;
- time at which the satellite will be able to observe the ZOI;
- etc. . . . .

More generally, any selection of one or more satellite that will be able to observe the ZOI is possible within method 600. The rules of selection of satellites may be determined in a defined case based upon the operational needs and objectives of an operator and/or client.

The embodiments of the steps 340*b* and 350*b* discussed with reference to FIG. 3*b* are respectively applicable to steps 630 and 640 respectively.

In particular:

- in a number of embodiments of the invention, the step 640 consists in identifying said one or more targets if values of parameters of said one or more objects match values of parameters of descriptors of targets;
- in a number of embodiments of the invention, the step 640 consists in identifying said one or more targets if values of parameters of said one or more objects do not match values of parameters of any descriptor of a non-target object.

According to various embodiments of the invention, the input may be received upon different circumstances.

In general, an input comprising the ZOI to observe may be received in any circumstance wherein a target identification is needed.

For example the input may be received at the occurrence of an event.

This allows the observation to be engaged as early as possible when the conditions to cause the observation are met.

The event may belong to different kinds:

- reception of a user request: this may be the case for example when a user requests the observation of a defined zone or position. The user request may be accompanied with parameters, such as a definition of the observation parameters, or a target type to observe;
- detection of a target: this may correspond to a previous detection of a target to track in or near the ZOI. The detection of the target may occur either from a previous satellite observation, or ground observations;
- planned observation event: this corresponds to a planned observation. For example, a defined ZOI may be observed periodically. This may for example be the case for zones of specific interest, such as a maritime zone which is known;

detection of the disappearance of a target: this corresponds to the disappearance of a potential target. For example, when ground receivers such as radars lose track of a target, an satellite observation may be requested to keep track of the target;

etc. . . . .

In a number of embodiments of the invention, the event is a detection of said one or more targets in said Zone Of Interest.

For example, it may be a detection of the one or more targets by one or more satellite, or a ground observation (e.g radar, detection on ground of a signal emitted by the one or more target, visual observation of the one or more target . . . ).

This allows engaging an observation as early as targets are detected in a zone. This is especially suitable when the one or more targets are undesirable targets, such as intruders, illegal activities, etc. . . . .

This is especially advantageous when the initial detection that caused the observation event has been performed by on ground. Indeed, a satellite observation allows quickly confirming a ground observation. Moreover, the satellite observation can complete the ground observation, for example by observing a larger zone, which may be useful if the one or more targets are moving fast.

In a number of embodiments of the invention, the one or more target is a vehicle, and said event is a detection of a disappearance of, or a loss of communication with said vehicle.

The vehicle may be any kind of vehicle. It may for example be a terrestrial vehicle (e.g car, train . . . ), a maritime vehicle (e.g boat, submarine . . . ) or an aerial vehicle (e.g plane, helicopter . . . ).

The disappearance of the vehicle may for example be detected when a detection means (radar, detection of car plate, visual observation . . . ) which was previously able to detect and locate the vehicle is not able to detect it anymore.

A loss of communication with a vehicle may for example occur when a vehicle which used a communication system to communicate with surveillance systems suddenly ceases the communication without any known or expected reason.

Raising an event to cause a satellite observation in such case allows detecting the presence and position of a vehicle that has disappeared. Satellite observations are well suited in such cases, because they allow observing a large zone around the last known position of the vehicle.

The output of the satellite observation may provide indications about the cause of the loss of communication. This is especially suited to detect that a vehicle is in danger, and engage rescue operations as quickly as possible, or conversely that a vehicle has been hijacked by unauthorized individuals and thus engage interception operations.

In a number of embodiments of the invention, said vehicle is configured to communicate with a surveillance system, and said event is a detection of a lack of reception of signals from said vehicle.

For example, the vehicle may be:

a boat communicating using AIS (Automatic Identification System), the event being the detection of the loss of the AIS signal;

an aircraft communicating with the ground using a CNS (Communication Navigation and Surveillance) system, such as for example CPDLC (Controller-Pilot Data-Link Communications), the event being the detection of the loss of the datalink with the aircraft;

more generally, each vehicle that communicates with a global communication and surveillance system, wherein the event is the detection of the loss of communication with the vehicle.

In this case, the observation by the satellites can be engaged early, because, in such communication and surveillance systems, the system is constantly in communication with the vehicle, so that the loss of communication can be detected very early after an unexpected event occurred in the vehicle. As the satellite observations allow locating the vehicle in a large area and gaining insight about the cause of the loss of communication, this improves the security of surveillance systems, by engaging an observation from a satellite as early as the signal from a vehicle is lost by the surveillance system.

When the event is the detection of one or more target, or conversely a detection of the disappearance or loss of communication with a vehicle, the Zone Of Interest to observe can be defined in different ways.

In general, a ZOI can be defined in order to observe the regions where the target can be found.

In a number of embodiments of the invention, the Zone Of Interest is centered on one of a last know position of the target, or an estimated position of the target.

Stated otherwise, the ZOI can be for example defined around:

the last known position of the target (for example the position of the target where it has been detected, or where it has emitted its last transmission to the surveillance system;

an estimated position of the target, which corresponds to an estimate of the current position the target, or a future position of the target. Such an estimated position can be for example obtained by interpolating the last known parameters of the trajectory of the target (e.g last positions, speed, directions, etc. . . . ).

This allows a more efficient observation of the target, because the ZOI is restricted to the zone wherein the vehicle is likely to be found.

In addition to the position of the ZOI, its dimensions may also vary depending upon trajectory parameters of the target.

For example, in a number of embodiments of the invention, one or more dimensions of the Zone Of Interest is dependent upon a position uncertainty of the target.

Stated otherwise, the size of the ZOI may vary depending upon the position uncertainty of the target: the more uncertainty, the larger the ZOI, in order to ensure that the target will actually be observed in the ZOI.

This optimizes the size of the ZOI to allow a more efficient observation.

The position uncertainty may be calculated depending upon a large number of factors: the time elapsed since the last received signal, speed of the vehicle, maneuvering and acceleration capabilities of the vehicle, etc. . . . .

The dimensions of the ZOI can be defined in different ways according to the position uncertainty. For example, they can be defined in order to ensure that a defined probability of observing the target is complied with.

The shape of the ZOI may also depend upon the characteristics of the trajectory of the target. For example, the ZOI may have either a regular shape centered on the estimated position of the target, or an irregular shape. An irregular shape can be useful to take into account the estimated direction of the target, and thus the higher probability for the target to be found in one direction rather than another.

The position uncertainty may affect the dimensions of the ZOI in 2D, but also in 3D.

For example, in a number of embodiments of the invention, said target is an aircraft, said Zone Of Interest is a 3D volume, and a height of said 3D volume is dependent upon an altitude uncertainty of the aircraft.

This allows an efficient definition of the ZOI to ensure that a satellite will be able to observe the aircraft.

In most cases, the ability of satellites to observe a large zone is sufficient to observe the whole desired zone, in case of high position uncertainty of the target.

However, in some cases, the position uncertainty of the target is too high to observe the whole desired zone in a single observation.

In order to tackle this issue, in a number of embodiments of the invention, the one or more processing logics 202 are configured to define a plurality of Zones Of Interest around one or more of estimated positions of the target.

Stated otherwise, a plurality of ZOIs may be defined, either around a single estimated position associated with a large uncertainty, or around a plurality of estimated positions, that may for example correspond to a plurality of different directions the target could follow.

This allows observing all the possible positions of the target, even when the position uncertainty is too large for performing a single observation.

One or more satellites can thus be tasked to observe the different ZOIs. Priorities can be defined among the ZOIs, for example to observe in priority the ZOIs wherein the likelihood of observing the target is higher.

Different exploration strategies may be implemented to define the ZOIs and prioritize the ZOIs to observe.

For example, the ZOIs may be prioritized to observe firstly the ZOIs wherein the likelihood of observing the target is higher. The likelihood of observing the target may be for example calculated depending upon:

the expected trajectory of the target;

the type of terrain found in each ZOI. For example, if the target is a boat, the ZOIs that comprise more water may be observed in priority;

the presence of points of interest in the ZOI. For example, if the target is a boat, the ZOI that comprise specific locations wherein the boat could seek to perform a specific activity can be observed in priority. Such locations could be for example a harbor wherein that the boat could seek to rejoin, an illegal fishery zone if the boat is an illegal fish boat, etc. . . . .

More generally, any strategy that allows prioritizing the observations depending upon the likelihood of observation of the target could be used to define and prioritize the ZOIs.

Figure 7:
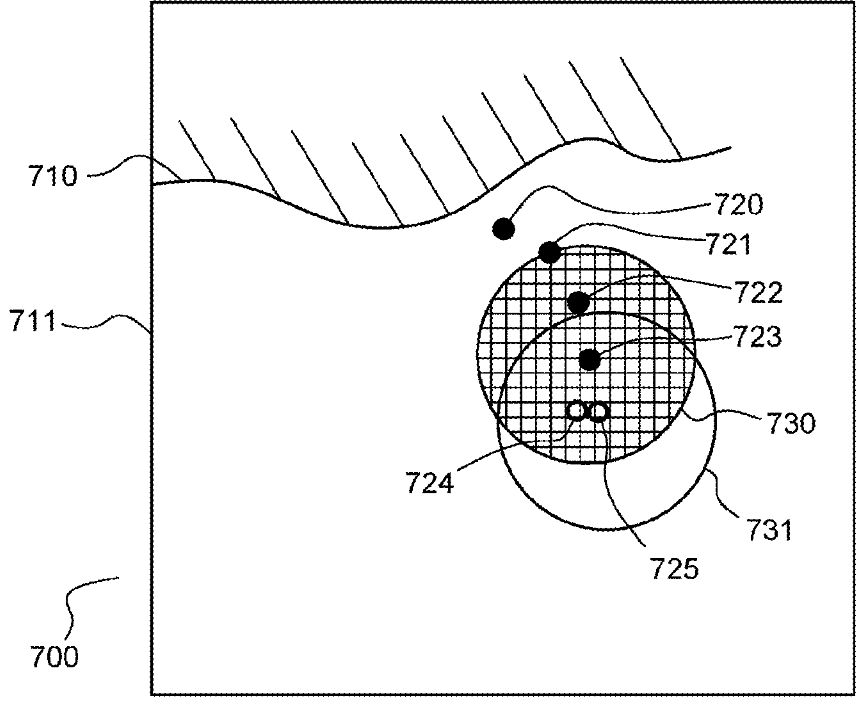
FIG. 7 represents an example of a determination of a Zone Of Interest according to a localization of a target in a number of embodiments of the invention.

FIG. 7 represents an example of a determination of a Zone Of Interest according to a localization of a target in a number of embodiments of the invention.

In a number of embodiments of the invention, the method 600 further comprises a step of locating said one or more targets.

Stated otherwise, the identification of the target can be accompanied by a localization of target. This localization can be performed by any suitable means depending upon the types of observations.

In particular, as explained above, each detected object can be associated with various parameters including its position. When a target is identified among objects, the position of the target can thus be retrieved.

This localization allows obtaining the location of the target for future tracking.

In particular, future positions of the target can be estimated based on the previously observed positions.

In a number of embodiments of the invention, the method 600 comprises determining one or more additional Zones Of Interest to observe based upon one or more of an observed position and estimated future positions of said one or more targets.

Stated otherwise, at each observation, an observed position of a target is obtained. A future position can be estimated from the previously observed positions. A new ZOI can be defined around the last observed position of the target, or an estimated future position. This ZOI serves as a basis for the next observation that will provide a newly observed position of the target, etc. . . . .

This allows iteratively defining ZOIs and obtaining observations of a target, to perform an accurate tracking of the target.

Defining the ZOI around the last observed position provides the advantage of simplicity, and allows tracking the target whatever the future trajectory of the target. The size of the ZOI can be defined according to the maximal speed and maneuvering capabilities of the target, in order to ensure that the target will be found in the observation of the ZOI.

Defining the ZOI around an estimated future position of the target provides a more accurate tracking of the target, but requires a reliable estimation of the target trajectory.

In the example of FIG. 7, the target is a boat which evolves in an environment 700 composed of a coast 710 and see 711.

Four previous satellite observations respectively allowed locating successively the boat at the positions 720, 721, 722 and 723.

In this example, a ZOI is defined at each iteration around the last known position of the target. Therefore, after obtaining the position 723, a ZOI 730 centered on the position 723 is defined, and the observation of the ZOI 730 allows locating the target at the position 724, which can serve as the center of a future ZOI.

This example demonstrates the ability of the method to perform an iterative tracking of a target.

In a number of embodiments of the invention, the ZOI for the next observation is not defined around the last observed position, but around an estimated future position. For example, a future estimated position 725 of the boat is determined based upon the previous positions 720, 721, 722 and 723. Then, a ZOI 731 can be defined around the estimated position 725 for performing the next satellite observation, and obtain a new observed position of the target.

This may allow a more accurate tracking of the target because, as shown in the FIG. 7, the estimated position 725, and actual position 724 of the target are very close. Therefore, the actual position 724 of the target is close to the center of the ZOI 731, while it was not close to the center of the ZOI 730.

In the example of FIG. 7, the estimated position 725 was obtained by a simple linear interpolation of the positions 722 and 723.

However, an estimated position can be obtained in many different ways. For example, the previous positions, speeds, accelerations may be interpolated. Different types of interpolations such as linear, polynomial or spline interpolations may be used. The maneuvering capabilities of the target may also be taken into account. The position estimation may also take into account parameters of the zone of operation, such as the presence of points of interest that the target may be seeking to rejoin, or conversely the presence of unreachable areas.

This example demonstrates that the tracking of the target can be performed with ZOIs defined in many different ways to ensure the most efficient tracking.

The embodiments of the invention encompass any non-mutually exclusive combination of the embodiments of the method 300*a*, 300*b* and 600.

For example, the method 600 may comprise a step 320 of selection of the observation satellites according to any of the embodiments discussed with reference to FIGS. 3*a* and 3*b*.

Conversely, the methods 300*a* and 300*b* can encompass any of the embodiments of event generation and/or tracking discussed with reference to FIG. 6.

The examples described above are given as non-limitative illustrations of embodiments of the invention. They do not in any way limit the scope of the invention which is defined by the following claims.

The invention claimed is:

1. An observation system comprising:
- a plurality of observation satellites;
- a communication link between said a plurality of observation satellites and one or more ground stations; and
- a computing system;
- wherein the computing system comprises one or more processing logic configured to:
  - receive as input a Zone Of Interest (ZOI), said input being received at the occurrence of an event, said event being a detection of one or more targets in the Zone Of Interest or the disappearance of one or more targets in the Zone Of Interest;
  - select one or more satellites among said plurality of observation satellites;
  - send to said one or more selected observation satellites instructions to perform one or more observations in said Zone Of Interest;
  - detect one or more objects in the output of said one or more observations; and
  - identify one or more targets from said one or more objects;
- wherein the one or more processing logic is further configured to:
  - estimate one of more future positions of one or more said targets;
  - determine one or more new Zones of Interest to be observed by one or more satellites, a new Zone Of Interest being defined around a last observed position of the target or around an estimated future position of a target; and
- wherein one or more dimensions of a Zone Of Interest depend upon trajectory parameters of the one or more targets and/or the target position uncertainty.

2. The observation system of claim 1, wherein the one or more processing logic is configured to identify said one or more targets if values of parameters of said one or more objects match values of parameters of descriptors of targets.

3. The observation system of claim 1, wherein the one or more processing logic is configured to identify said one or more targets if values of parameters of said one or more objects do not match values of parameters of any descriptor of a non-target object.

4. The observation system of claim 1, wherein at least one of said one or more targets is a vehicle, wherein said vehicle is configured to communicate with a surveillance system, and said event is a detection of a lack of reception of signals from said vehicle.

5. The observation system of claim 1, wherein at least one of the one or more targets is an aircraft, said Zone Of Interest is a 3D volume, and a height of said 3D volume is dependent upon an altitude uncertainty of the aircraft.

6. The observation of claim 1, wherein said one or more processing logic is configured to define a plurality of Zones Of Interest around one or more estimated positions of the target.

7. The computing system of claim 1, wherein said one or more processing logic is further configured to determine one or more additional Zones Of Interest to observe based upon one or more of an observed position and estimated future positions of said one or more targets.

8. A computer-implemented observation method implemented in an observation system comprising a plurality of observation satellites, and a communication link between said observation satellites and one or more ground stations, wherein the method comprises:
- receiving as input a Zone Of Interest (ZOI), said input being received at the occurrence of an event, said event being a detection of one or more targets in the Zone Of Interest or the disappearance of one or more targets in the Zone Of Interest;
- selecting one or more satellites among said plurality of observation satellites;
- sending to said selected observation satellites instructions to perform one or more observations in said Zone Of Interest;
- detecting one or more objects in the output of said one or more observations;
- identifying one or more targets from said one or more objects;
- determining an observed position of said one or more identified targets in said Zone Of Interest,
- wherein the method further comprises:
- estimating one of more future positions of said one or more targets; and
- determining one or more new Zones of Interest to be observed by one or more satellites, a new Zone Of Interest being defined around a last observed position of the target or around an estimated future position of a target;
- wherein one or more dimensions of a Zone Of Interest depend upon trajectory parameters of the one or more targets and/or the target position uncertainty.

9. A computer program product, stored on a non-volatile computer-readable data-storage medium, comprising computer-executable instructions to cause a computer system to carry out the computer-implemented observation method according to claim 8.

10. The observation system of claim 1, wherein said position uncertainty is calculated depending upon a number of factors including the time elapsed since the last received signal, the speed of the vehicle, the maneuvering and acceleration capabilities of the vehicle.

11. The observation system of claim 1, wherein priorities are defined among said plurality of Zones Of Interest, the priorities being related to the likelihood of observing a target in said Zones Of Interest, the selected observation satellites being tasked to observe the different Zones Of Interest according to said priorities.

12. The observation system of claim 1, wherein said one or more processing logic is further configured to define the shape of a Zone Of Interest depending upon the characteristics of the trajectory of the target.

13. The observation system of any of claim 1, wherein said selection further depends upon a communication link budget of each observation satellite defining an amount of information that can be transmitted by the observation satellite to a ground station.

14. The observation system of claim 13, wherein an observation satellite and a ground station each comprise one or more antennas, and wherein the communication link budget for a satellite is calculated as a function of:

communication capabilities of the satellite;

characteristics of the one or more antennas of the ground station;

distance between the satellite and the ground station;

relative orientations of the antennas of the satellite and the ground station;

communication time frame wherein the satellite is able to communicate with the ground station.

15. The observation system of claim 1, wherein the computing system comprises a set of databases comprising at least an ephemeris database containing a description of the orbits of the plurality of observation satellites, a satellite capabilities database storing information relative to the capabilities of each of the satellites including observational capabilities, attitude manoeuvers capabilities and communication capabilities, a ground station database containing descriptors of ground stations to which said observation satellites are adapted to send observations, and a target database listing known targets.

16. The observation system of claim 15, wherein said selection is determined from the data stored in the ephemeris database, the satellite capabilities database, the ground station database, and/or the target database.

* * * * *